Oct. 31, 1933.  J. V. KINDL  1,933,177
VALVE
Filed Oct. 10, 1931  2 Sheets-Sheet 1

INVENTOR
JOSEPH V. KINDL
BY
Fisher, Moser + Moore
ATTORNEY

Oct. 31, 1933. J. V. KINDL 1,933,177
VALVE
Filed Oct. 10, 1931 2 Sheets-Sheet 2
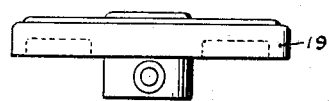
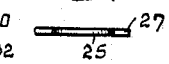
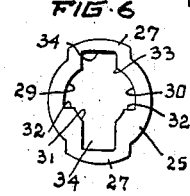
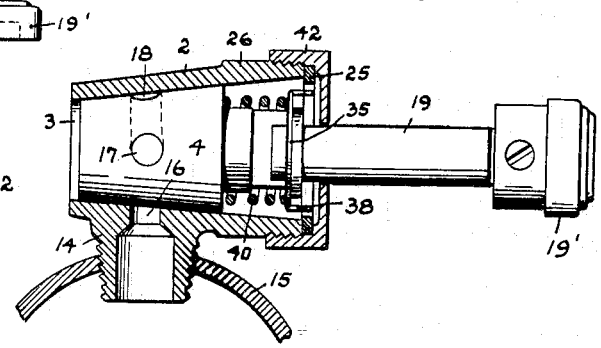
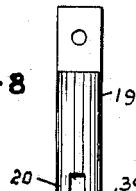
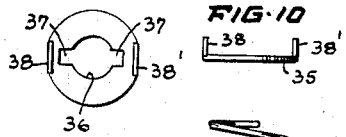
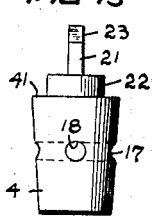
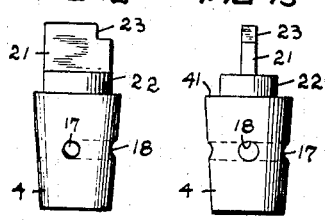
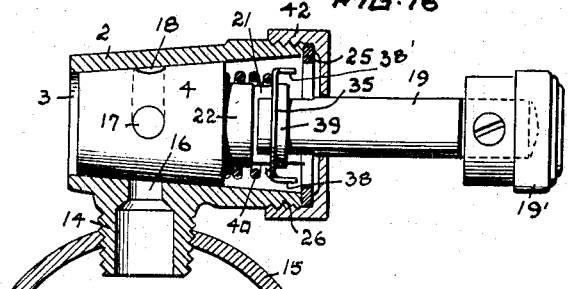
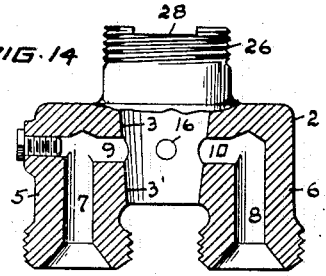
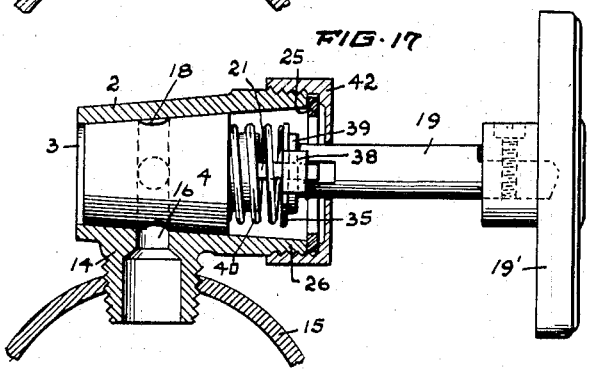
INVENTOR
JOSEPH V. KINDL
BY
ATTORNEY Patented Oct. 31, 1933

1,933,177

UNITED STATES PATENT OFFICE 1,933,177

VALVE

Joseph V. Kindl, Cleveland, Ohio, assignor to The W. J. Schoenberger Company, Cleveland, Ohio, a corporation of Ohio Application October 10, 1931. Serial No. 568,153

2 Claims. (Cl. 251—165)

My invention relates to new and useful improvements in gas fixtures and has reference to gas cocks or valves to prevent accidental opening of gas service lines, and more particularly to those related to gas stoves, ranges and the like, the general object being to provide a construction both simple and inexpensive which precludes accidental or careless opening of a gas supply control such as a cock or valve.

A principal feature of my present invention is the provision of means normally acting to prevent turning movement of the valve, which means can only be manipulated to open the service line, when the operating stem and handle have been axially shifted by pushing them toward the valve body, after which the gas supply passage may be made free and the service line opened by a turn of said stem and handle.

A further feature resides in the construction of the valve proper, which comprises a tapered valve plug revolubly mounted in a valve body, and a stem slidably interengaged with an extension of said valve plug and revoluble therewith in the valve body.

Further features and advantages of the various parts of the structure will be hereinafter apparent in the specification taken in connection with the accompanying drawings, in which an exemplified form of the invention is illustrated.

Figure 1:
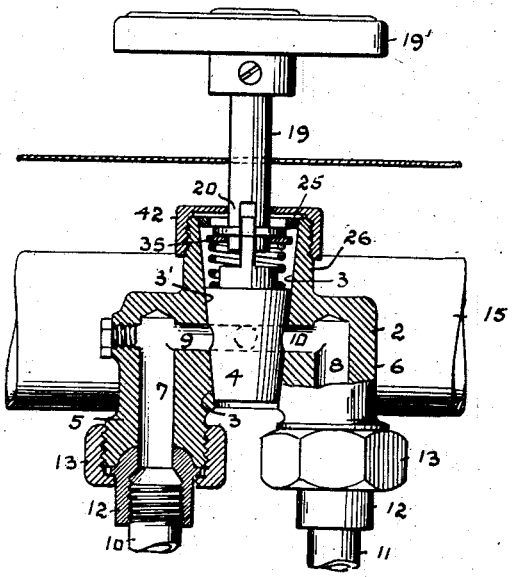
Figure 2:
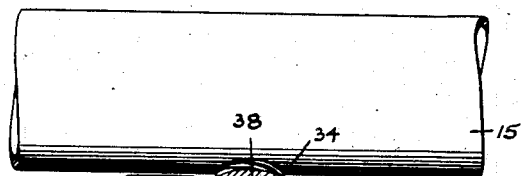
Figure 3:
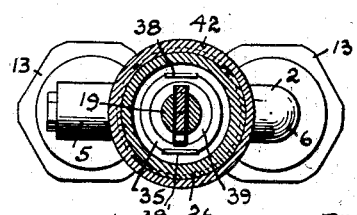

Thus, the drawings show in Figure 1 a central section through a two-way valve embodying the invention attached to the manifold of a range or gas stove (not shown). Figure 2 is a section on line 2—2 of Figure 1 and Figure 3 a section on line 3—3 of Figure 1. Figure 4 through Figure 14 show the parts of the valve illustrated in Figure 1. Thus, Figure 4 is a side elevation of the handle, Figure 5 a sectional view of the nut, connecting handle and shaft with the valve body, and Figures 6 and 7 plan and side elevations of a washer or top plate interlocked with the top portion of the body of the valve. Figure 8 is a side elevation of the operating stem and Figures 9 and 10 plan and side elevations of the lock washer. Figure 11 is a side elevation of the spring seating the valve and lock washer; Figures 12 and 13 are side elevations of the rotatable valve, and Figure 14 a side elevation partly in section of the valve body. Figures 15 through 17 are enlarged fragmentary sectional views through the valve taken on line A—A of Figure 1. Thus, Figure 15 shows the valve in locked neutral position, Figure 16 a view similar to Figure 15 with the operating stem and handle axially shifted and Figure 17 also a view similar to Figure 15 but with the valve in unlocked open position.

Referring to the drawings, the U-shaped cast metal body 2 of the two-way valve disclosed therein has its central portion perforated or cored as at 3 for receiving the plug valve 4, which rotatably contacts the cone-shaped seat 3'. The branches 5 and 6 of body 2 communicate with opening 3 through passages 7, 8, 9, and 10, respectively, drilled in the body portion and branches thereof, and the outer ends of such branches are screw-threaded for connecting thereto, gas pipes 10 and 11, nipples 12 and nuts 13 being employed for rigidly holding the pipes in place. Body 2 includes a lateral branch or nipple 14 arranged in a plane substantially at right angles to the plane of branches 5—6, which nipple is threaded at its outer end for convenient attachment to the manifold 15 of a range or gas stove (not shown). Nipple 14 is hollow and communicates through passage 16 with opening 3, which in turn communicates with passages 7 and 8 through passages 9 and 10. A series of intersecting passages 17 and 18, in plug valve 4 may alternatively be brought into alignment with passages 9, 10 and 16, for the purpose of feeding gas to pipes 10 and 11. The valve just described is an ordinary two-way valve having two open positions, and a neutral closed position, in which the gas supply is entirely shut off.

In operation plug valve 4 is manually rotated by means of a slotted valve stem 19 inter-engaging at its slotted lower end 20, with a flat portion or extension 21 extending from the narrowed circular top 22 of the valve, which stem is provided with a handle 19' rigidly attached thereto at its upper end. Flat portion 21 is cut away at one side thereof, as at 23, and extends through a top plate 25 seated upon the screw-threaded neck 26 of body 2. Top plate 25 is provided with integral arms 27 which interlock with recesses 28 in said neck and prevent displacement of the plate, the latter being formed with an enlarged opening 29 to permit connection between stem 19 and extension 21 of valve 4. The wall of opening 29 which is of irregular configuration, includes axially aligned arcuate portions 30 and 31 of different radii, the former being larger than the latter, to provide stop shoulders 32 for limiting the rotation of valve 4. The radius of the arcuate portions 30 is equal to half the width of flat portion 21 of plug 4, both radial portions 30, 31 being cut away at 33, 33' to form rectangular recesses 34, 34' centrally and oppositely disposed with respect to the arcuate portions for a purpose later to be described. According to this arrangement of two interconnected arcuate portions the rotation of valve plug 4 is stopped when flat portion 21 engages shoulders 32.

Valve stem 19 supports a spring pressed locking washer 35 tightly sleeved over the slotted lower end 20 of said stem to prevent spreading thereof. This washer is provided with a key-shaped opening 36, of proper size to slidably receive flat portion 21 of valve 4. The opening 36 is of circular shape and formed with two oppositely arranged rectangular cut out portions 37. Washer 35 is also provided with two rectangularly offset finger portions 38, 38' in axial alignment with the rectangular cut out portions 37, adapted to engage recessed portions 34 and 34' respectively in top plate 25, thus limiting the rotation of valve 4 to a half turn in either direction between stop shoulders 32. The lower slotted portion of stem 19 is provided with a round collar 39, which forms a seat and stop for washer 35 and which also engages the plate 25, thus limiting upward movement of the stem, a spring 40, seated upon a circular offset 41 on valve 4 resiliently forcing washer 35 and stem 19 into constant engagement with top plate 25. A hollow cap member 42, threaded upon neck 26 of body 2 is employed to secure plate 25 in place.

When valve plug 4 is seated to close supply passage 16 from communication with passages 7 and 8, washer 35 is yieldably forced upwardly thus bringing the finger portions 38, 38' into engagement with recesses 34, 34' respectively of top plate 25, see Figure 15. To release the finger portions 38, 38' of this washer, stem 19 is pushed inwardly until said fingers are entirely drawn out of recesses 34 and 34', whereupon after a slight turn of stem 19, fingers 38—38' will seat and ride on the inner face of plate 25. In this position when washer 35 is axially shifted, see Figures 16 and 17, the valve stem 19 and valve 4 may be freely rotated to make the desired connections between the main feed lines 10 and 11 respectively. Turning of stem 19 and valve 4 in opposite directions to neutral position brings finger portions 38—38' of washer 35 into alignment with recesses 34—34' in which position spring 40 shifts washer 35 and stem 19 axially sufficiently to cause the finger portions to engage said recesses 34—34', thus preventing further rotation of the valve. Consequently, it will be seen that it is impossible to rotate the valve beyond its neutral position, unless the valve stem is first forced inwardly to release the finger portions of the washer from their interlocking positions in recesses 34—34' respectively.

The locking mechanism hereinbefore described, may of course be utilized with different types of valves, for example, with one-way gas range burner valves. It should also be understood that slight changes, such as the provision of the locking washer 35 with a single finger portion, may be made without departing from the scope of the invention.

What I claim, is:

1. A valve, comprising a valve body having a valve seat, a valve rotatably confined within said seat having a notched flat extension, a shaft axially shiftably and non-rotatably interlocked with said valve, a top plate for said valve body having an opening of irregular configuration to form oppositely and arranged recesses and individual stop shoulders, means slidably and non-rotatably interlocked with said valve and including upwardly extending finger portions fitting said recesses for locking said shaft and valve against rotation when said valve is rotated to its neutral position, and means to force said locking means yieldingly toward said top plate, said notched extension cooperating with the stop shoulders of said top plate in limiting rotation of said valve.

2. A valve, comprising a valve body having a valve seat, a valve provided with a notched flat extension rotatably confined within said seat, a shaft slidably and non-rotatably interlocked with said valve, a top plate encircling said stem and formed with recesses and with stop shoulders cooperating with said flat extension in limiting rotation of said valve, a washer slidably and non-rotatably interlocked with said valve and in axial alignment with said stem, locking extensions on said washer co-operating with recesses in locking said valve in neutral position and means yieldingly forcing said washer against said top plate and said locking extensions into said recesses thereof.

JOSEPH V. KINDL.